Figure 1:
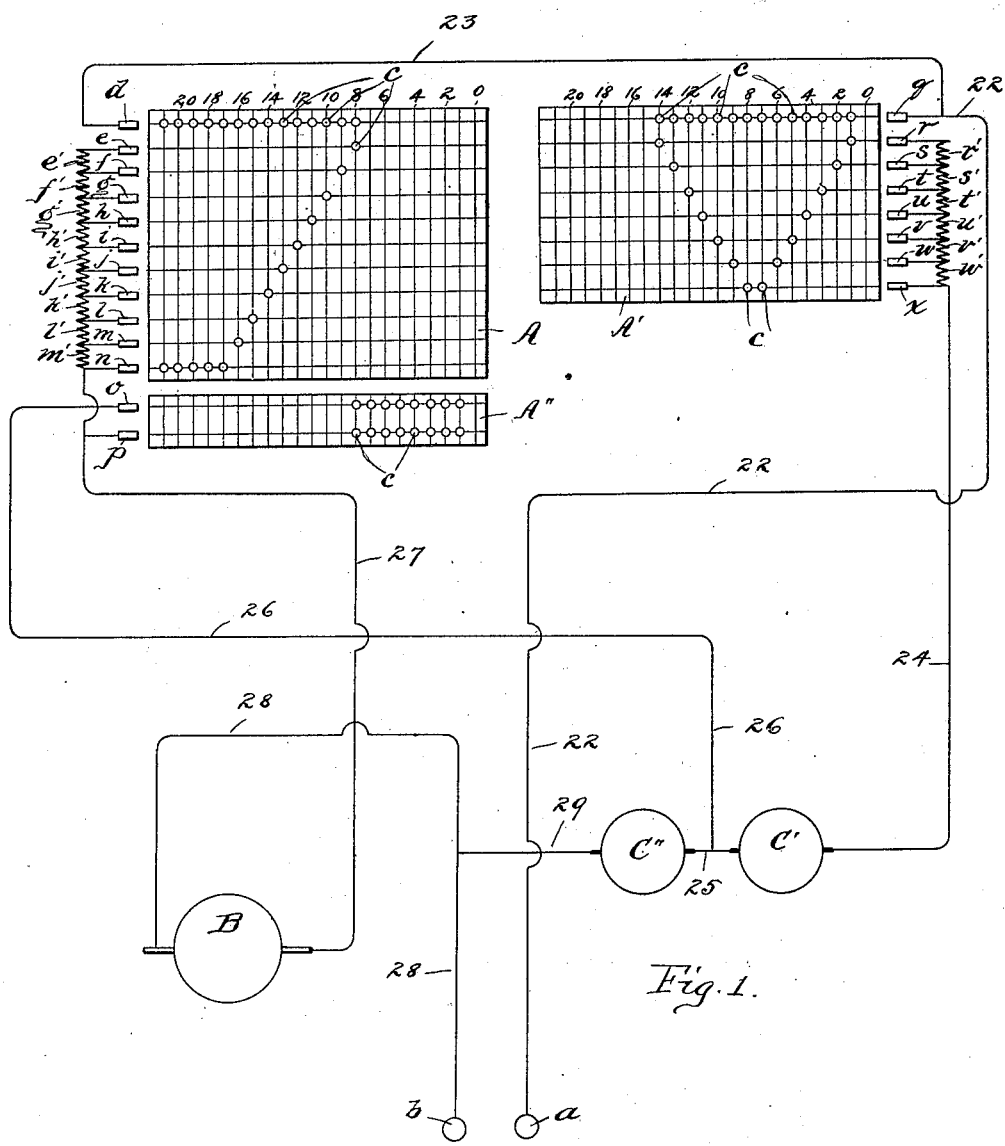
Figure 2:
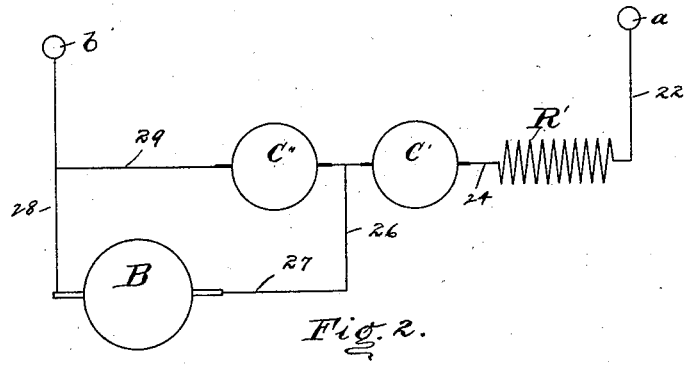
Figure 3:
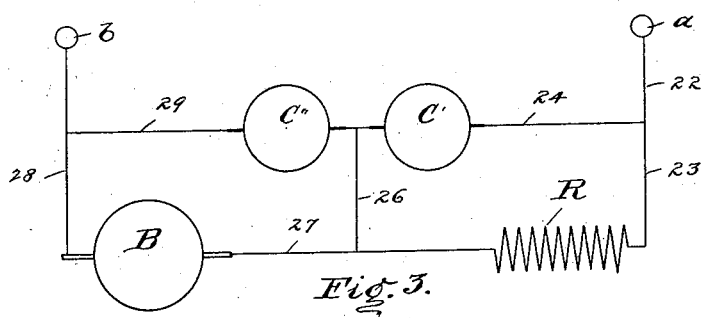
Figure 4:
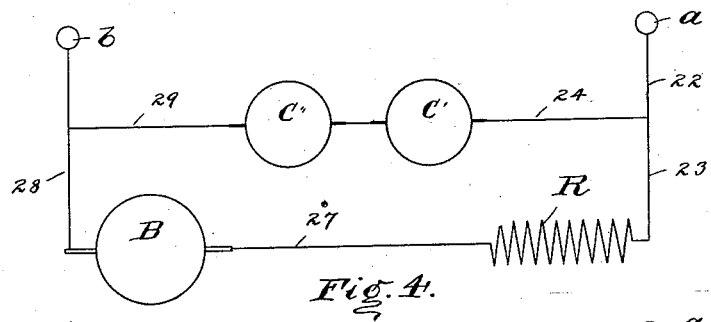

No. 650,370. Patented May 29, 1900.
W. COOPER.
APPARATUS FOR STARTING MOTORS.
(Application filed Mar. 24, 1900.)
(No Model.) 2 Sheets—Sheet 1.

Witnesses.
Clarence E. Mehlhope
Edward J. Haat

Inventor.
William Cooper
By Arthur Stem
Attorney.

No. 650,370. Patented May 29, 1900.
W. COOPER.
APPARATUS FOR STARTING MOTORS.
(Application filed Mar. 24, 1900.)

(No Model.) 2 Sheets—Sheet 2.

Witnesses.
Clarence E. Mehlhope
Edward J. Haat

Inventor.
William Cooper,
By Arthur Stem,
Attorney.

THE NORRIS PETERS CO., PHOTO-LITHO., WASHINGTON, D. C.

UNITED STATES PATENT OFFICE.

WILLIAM COOPER, OF CINCINNATI, OHIO, ASSIGNOR TO THE BULLOCK ELECTRIC MANUFACTURING COMPANY, OF SAME PLACE.

APPARATUS FOR STARTING MOTORS.

SPECIFICATION forming part of Letters Patent No. 650,370, dated May 29, 1900.

Application filed March 24, 1900. Serial No. 10,087. (No model.)

*To all whom it may concern:*

Be it known that I, WILLIAM COOPER, a citizen of the United States, residing at Cincinnati, in the county of Hamilton and State of Ohio, have invented certain new and useful Improvements in Apparatus for Starting Motors, of which the following is a full, clear, and exact description, reference being had to the accompanying drawings, which form part of this specification.

My invention relates to apparatus for starting electric motors. It is particularly applicable for use in connection with motors which are operated from supply-circuits of approximately-constant potential and which are used for the purpose of driving that class of machinery wherein the moment necessary to start it in motion exceeds that necessary to accelerate and maintain the motion.

The object of the invention is to furnish a controller which shall utilize the current to best advantage and start the motor without shock and without loss of energy. By its use the speed of the motor is under perfect control and may be easily regulated without loss of current. The motor may be run at any speed, from the lowest to the highest rate, with an even, constant motion which is impossible with the style of controller heretofore in use. When the motor is running at full speed, its speed may be decreased to any slower speed or may be stopped instantly.

In carrying out my invention I interpose in the electric circuit apparatus for producing a fixed multiplication of the current from the supply-circuit, which multiplied current is used in starting the electric motor. After the machinery is started in motion I withdraw this multiplied current from the circuit. The apparatus, however, is so arranged that this multiplied current, which is current of low potential, may be again introduced when it is desired to decrease the speed of the motor. The multiplying of the current above referred to may be accomplished by transformation, and for this purpose any suitable converter may be used. To accomplish best results, the primary and secondary windings should have a definite and constant inductive relation. Both windings should be in the same magnetic circuit, in which case the ratio or multiplying power of the current will be approximately the ratio of secondary turns to primary turns in the same way as with mechanical gearing, wherein the multiplying power of the movement is the ratio of the number of teeth of one gear to that of the other with which it engages.

The invention is designed for use upon either continuous or alternating currents. When continuous currents are used, the motor should, in order to produce best results, be a continuous-current motor and the current be changed to alternating current for the purpose of transformation and the transformed current then rectified to continuous currents before reaching the motor by any well known device for transforming continuous currents. Whether used with continuous or alternating currents the converter may consist of any device, rotary or otherwise, for multiplying or changing the current, according to the nature and requirements of the particular machine to which the invention is to be applied, it being here noted that I have used the term "converter" in its broadest sense to include all such devices.

In the drawings, Figure 1 is a diagrammatic representation of an apparatus embodying my invention. Figs. 2, 3, 4, and 5 are diagrams of the metallic circuit existing in various positions of the controller.

Referring to the drawings, *a* and *b* are the terminals of the supply-circuit, from which current is to be taken to operate the motor.

B represents the motor to be started; C' and C'', respectively, the primary and secondary of the converter, and A A''' A'' the controller, which is adapted to throw into and out of circuit the converter and whose purpose and object will appear more fully as I proceed with my description.

A, A', and A'' are the developed surfaces of three cylindrical drums, made of any suitable conducting material. The drums A and A'' are mounted on the same shaft (left out of the drawings for the sake of clearness) and insulated from said shaft and from each other in any convenient manner. The drum A' is mounted on a shaft parallel to the first shaft and is also insulated. It will readily be understood that these three drums might be mounted on the same shaft. These shafts are provided with suitable gearing, so that they may be both turned at the same time and at the same rate. The drums are provided with a number of projecting buttons C, which are adapted to contact with another series of buttons $d\ e\ f$ to $p$ and $q\ r\ s$ to $x$ as they are brought under the latter by the rotation of the drum. The buttons $d$ and $q$ are connected, respectively, by wires 23 and 22 to terminal $a$ of the supply-circuit. The buttons $r\ s\ t$ to $x$ are connected by the resistance-coils $r'\ s'$ to $u'$ and the last of the series $x$ by the wire 24 to the primary of the converter $C'$. $C'$ and $C''$ are connected together by the wire 25, and the latter is connected by the wire 26 with the contact-point $o$. The contact points or buttons $e\ f$ to $n$ are connected by resistance-coils $e'\ f'$ to $m'$, and $n$ is connected by the wire 27 with the motor B. A wire 28 leads from the motor B to the terminal $b$ of the supply-circuit, and said wire 28 is connected by a wire 29 to the secondary of the converter $C''$.

A number of lines 0 1 2 to 21 are indicated on the surfaces of the cylinders A, A″, and A′, and as the cylinders are rotated simultaneously these lines are brought successively under the contact-buttons $q\ r\ s$ to $x$ and $d\ e\ f\ g$ to $p$ in the same order—e. g., the line 5 on the drum A′ is under the series of buttons $q\ r$ to $x$ at the same time that the line 5 on the cylinders A A″ is under the series of buttons $d\ e$ to $p$. It will be noted that there are no buttons on the line $o$ on either cylinder, and when the drums are in this position the circuit is open.

Figure 5:
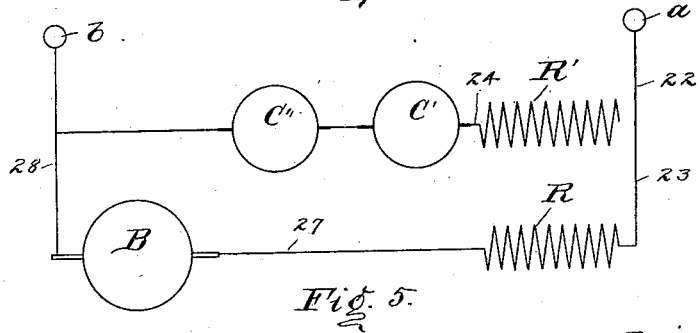

To start the motor, the cylinders are revolved so as to bring the lines 1 into contact position. In this position the two buttons $q$ and $r$ are connected and also the two buttons $o$ and $p$, and we have the current from the supply-circuit, decreased by the resistances $r'\ s'$ to $w'$, passing through the primary $C'$ of the converter and thence to the motor, and also a largely-increased current of low potential induced in the secondary $C''$ and also passing through the motor. The metallic circuit is substantially that shown in Fig. 2. The drums are now revolved, bringing the lines 2 3 4, &c., into the position of contact and cutting out successively the resistances $r'\ s'$, &c., until the line 8 is in position of contact. In this position buttons $d\ e$ are connected, and the current of the main circuit is introduced directly through the resistances $e'\ f'\ g'$ to $m'$ into the motor, the circuit being substantially that shown in Fig. 3. When line 9 reaches the position of contact, the connection between contact-point $o$ and $p$ is broken, thus changing the circuit to that shown in Fig. 4. As the drums are further revolved the resistances $r'\ s'$ to $w'$ are gradually introduced into the converter-circuit again and the resistances $e'\ f'$, &c., are taken out of the main circuit until line 15 is reached, when the converter-circuit is broken and the complete circuit is as shown in Fig. 5. Further revolution of the drums finally takes out all the resistance and allows the full current of the main circuit to pass through the motor. It will be readily seen that by revolving the drums in the opposite direction the resistances are again introduced and the converter may again be introduced into the circuit, and thus the speed of the motor be decreased just as before it was increased.

I am aware that it is not new thus to use a converter and resistances in a circuit to start a motor from a position of rest, and thus work it up to full speed; but in such machines hitherto at a certain stage the converted circuit has been cut out completely and in such a way that it could not be introduced into the circuit again without first putting the controller into its initial position, so that if any intermediate speed between full speed and rest was desired after working the machine up to full speed it was necessary to stop the machine completely and then work it up to the desired speed. The novel feature of my invention is that the converter may be gradually introduced into the circuit again after full speed has been attained and by such introduction of the converter any slower speed than full speed be attained. The speed may be thus increased or decreased at will. I do not wish to limit myself to any particular construction of controller for doing this; but the one I have shown is the one preferred.

What I regard as new, and what I desire to cover by Letters Patent, is—

1. The combination with an electric motor, of a supply-circuit, means for connecting the motor with the supply-circuit, a converter in circuit with the motor and with the supply-circuit, means for breaking the converter-circuit at an intermediate speed of the motor, and means for closing the converter-circuit at said intermediate speed, substantially as and for the purpose described.

2. The combination with an electric motor, of a supply-circuit, means for connecting the motor with the supply-circuit, a controlling-rheostat in said supply-circuit, a converter in circuit with the motor and with said supply-circuit, and means for breaking and making at will, the converter-circuit, at an intermediate speed of the motor, substantially as and for the purpose described.

3. The combination with an electric motor, of a supply-circuit, means for connecting the motor with the supply-circuit, a controlling-rheostat in said circuit, a converter, means for interposing said converter in said circuit intermediate the rheostat and motor, means for withdrawing said converter from the circuit, and means for returning said converter to the circuit at an intermediate speed, substantially as and for the purpose described.

4. The combination with an electric motor of a supply-circuit, means for connecting the motor with the supply-circuit, a converter in circuit with the motor and with the supply-circuit, means for varying the strength of the current from the converter, means for cutting the converter out of circuit at an intermediate speed of the motor, and means for returning the converter to the circuit at an intermediate speed, substantially as and for the purpose described.

5. The combination with an electric motor of a supply-circuit, means for connecting the motor with the supply-circuit, a converter in circuit with the motor and the supply-circuit, means for varying the relative values of the current from the supply-circuit, and converter-circuit, means for cutting said converter out of circuit and means for returning said converter to the circuit at an intermediate speed, substantially as and for the purpose described.

6. The combination with an electric motor, of a supply-circuit, means for connecting the motor with the supply-circuit, a converter in circuit with the motor, a source of current-supply connected with the converter, means for breaking the converter-circuit, and means for returning the converter to the circuit at an intermediate speed, substantially as and for the purpose described.

7. The combination with an electric motor, of a supply-circuit, a local circuit induced from said supply-circuit, both of said circuits being connected with the armature of the motor, a switching device adapted to open said induced circuit at an intermediate speed, and to close said induced circuit, at the same intermediate speed, substantially as and for the purpose described.

8. The combination with an electric motor, of a supply-circuit, a converter, a controlling-rheostat, two series of resistances therein, one in the converter-circuit and one in the motor-circuit, means for varying said resistances, means for cutting out said converter at an intermediate speed and means for returning said converter-circuit at the same intermediate speed, substantially as and for the purpose described.

WILLIAM COOPER.

Witnesses:
   EDWARD J. HAAT,
   CLARENCE E. MEHLHOPE.